Dec. 30, 1947.  K. RAPP  2,433,578
FEATHER BROODER
Filed Sept. 18, 1944　　2 Sheets-Sheet 1

INVENTOR
Kenneth Rapp
BY
ATTORNEYS

Dec. 30, 1947.　　　　K. RAPP　　　　2,433,578
FEATHER BROODER
Filed Sept. 18, 1944　　　2 Sheets-Sheet 2
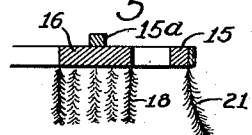
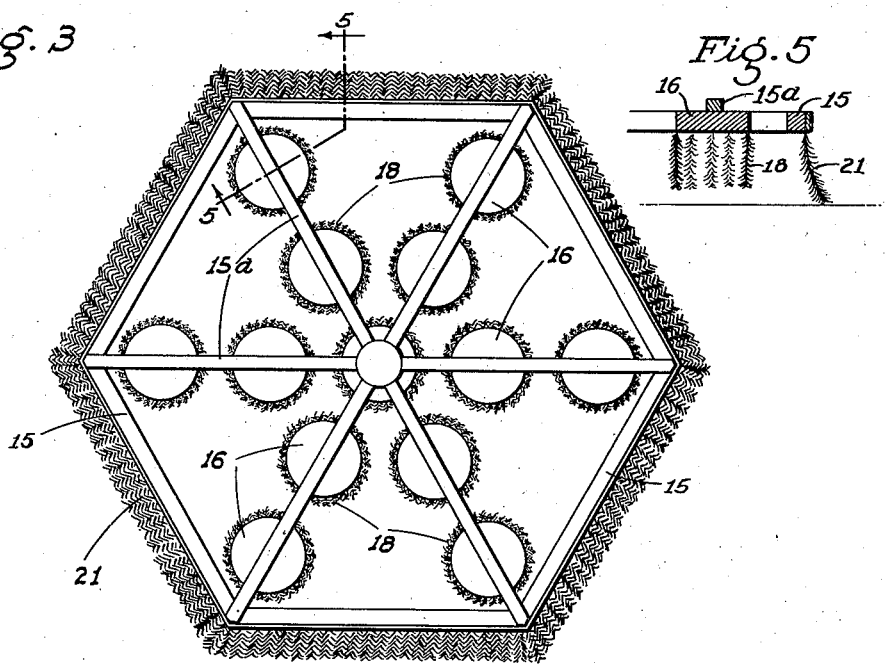
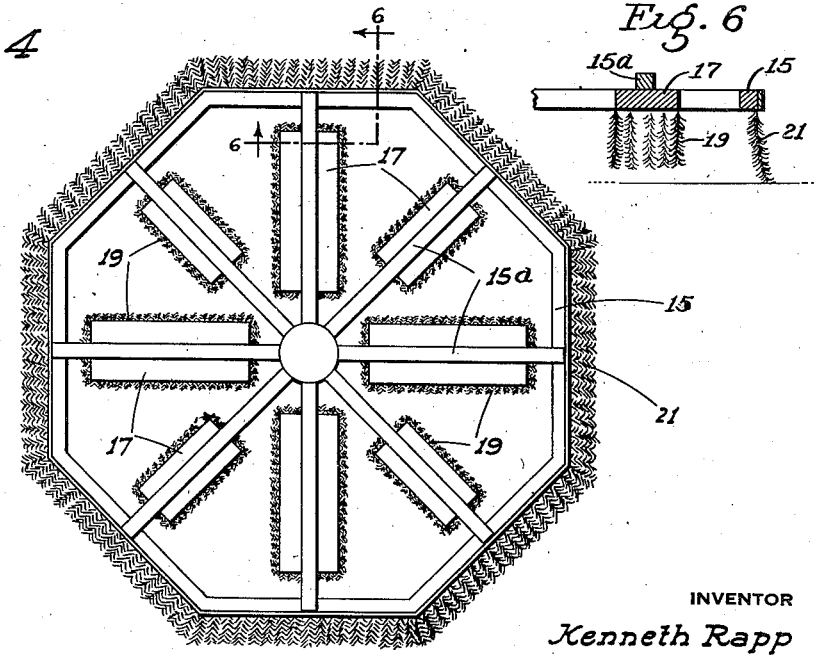
INVENTOR
Kenneth Rapp
BY
ATTORNEYS Patented Dec. 30, 1947

2,433,578

UNITED STATES PATENT OFFICE 2,433,578

FEATHER BROODER

Kenneth Rapp, Merced County, Calif.

Application September 18, 1944, Serial No. 554,569

1 Claim. (Cl. 119—33)

This invention relates in general to an improved electrically heated brooder wherein poultry feathers are employed to provide a protective and natural curtain about the sheltered poults; and in particular the invention represents improvements over the brooder shown in U. S. Patent No. 2,289,454, dated July 14, 1942.

One of the objects of the present invention is to improve the feather curtain and supporting frame arrangement of the brooder to the end that adequate fresh air to the poults is assured; other poultry is prevented from roosting on the device; and maximum capacity is obtained without crowding or smothering the poults.

Another object of the invention is to provide a brooder of the type described, including a peripheral feather curtain disposed to form an outer depending windbreak which surrounds the entire brooding area and extends to ground level, and other depending feather curtains within the brooder which surround corresponding heating units to form a plurality of relatively smaller, heated brooding areas; the brooder having ventilation openings in the top between the separate brooding areas, and said other curtains terminating at their lower edges adjacent but short of the ground to prevent undue heat escape from said separate brooding areas, while permitting adequate ventilation thereof and to permit freedom of entry of the poults.

An additional object of this invention is to provide in a brooder which includes a top having ventilation openings therein, a perforate, relatively steep sided cage mounted over and enclosing the top of the brooder to prevent poultry from roosting on said top, with resultant blocking of the ventilation openings therein.

It is also an object of the invention to provide a brooder which is suspended from a point above ground; the only part of the brooder which engages the ground being the outer dependent curtain of feathers which serves as the wind-break.

A further object of the invention is to produce a simple and inexpensive brooder, and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views:

Figure 3 is a top plan view of the brooder with the cage detached, showing a modification of the brooder top.

Figure 4 is a similar view but shows a still further modification of the brooder top.

Fig. 5 is a sectional view on a line 5—5 of Fig. 3.

Fig. 6 is a sectional view on a line 6—6 of Fig. 4.

Figure 1:
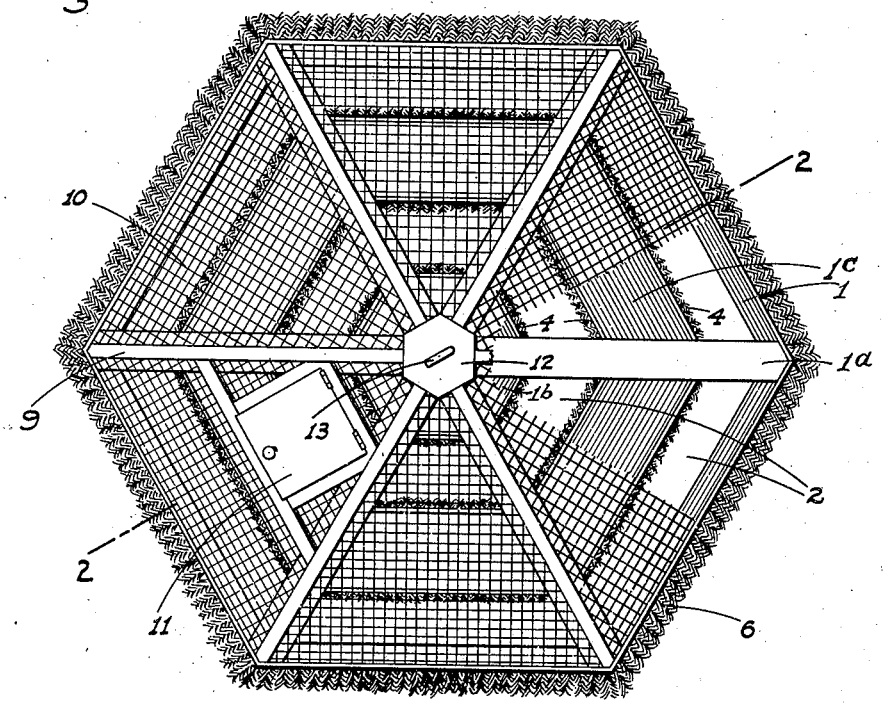
Figure 1 is a plan view of my improved brooder with the cage partly broken away.
Figure 2:
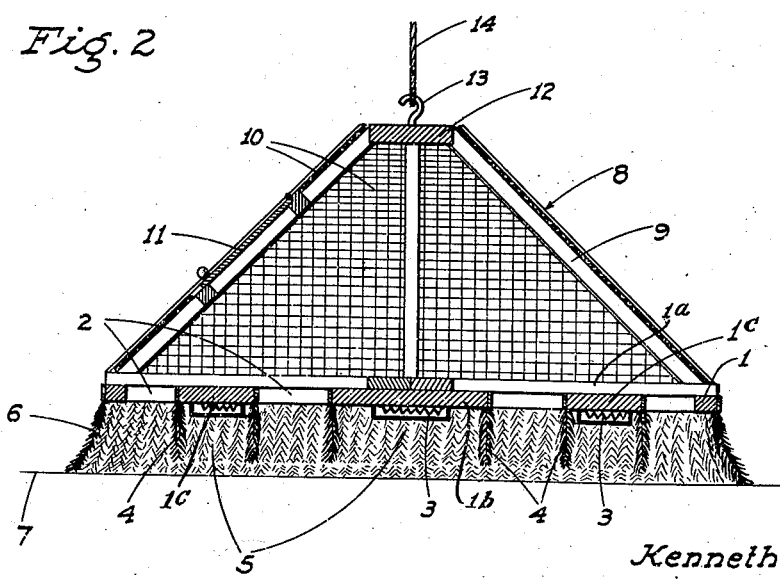
Figure 2 is a cross section on line 2—2 of Fig. 1, showing the brooder as suspended for use.

Referring now more particularly to the characters of reference on the drawings, and particularly at present to the structure shown in Figs. 1 and 2, the brooder comprises a supporting frame which in the embodiment shown in Figs. 1 and 2 comprises a substantially hexagonal peripheral frame element 1 and spaced transversely disposed frame elements 1a. A solid cover element 1b is supported by the frame elements 1a at the center of the supporting frame, and another solid cover element 1c is supported from the frame elements 1a substantially concentric with and in spaced relation from the members 1 and 1b thereby forming spaced, substantially continuous ventilation openings 2 which are symmetrical to the periphery of the supporting frame.

Under each of the solid cover elements 1b and 1c is secured an electric heating unit 3 which may be continuous or sectional, as desired and while here shown as an enclosed grid type unit, a bulb type unit may be used.

About each edge of each cover element 1b and 1c is a depending curtain of feathers 4 forming brooding areas 5 beneath such cover elements. The lower edges of these cover curtains are normally spaced from the ground. Thus, while such curtains prevent undue heat escape from the brooding areas 5 through the ventilation openings 2, the spaces between the bottom edges of the curtains and the ground permit of sufficient access of air into the brooding areas 5 so that smothering of the poults will not occur. This is an important feature of the invention.

Another endless feather curtain 6 is fixed to the periphery of the frame element 1 and depends downward a greater distance than the curtains 4, whereby said curtain 6 engages the ground 7 when the brooder is in use; serving effectively as a protective screen and windbreak for the poults within the brooder.

Above the frame element 1 the brooder includes a perforate cage 8 of substantial pyramidal, steep sided form, which cage includes a rigid frame 9 and a covering of screen wire 10 or the like. This cage also includes an access door 11. At the top the cage 8 includes a horizontal block 12 to which an upstanding hook 13 is affixed, and a flexible cord 14 is connected to the hook 13 and suspends the entire brooder from any suitable elevated and fixed point, as for example a rafter.

In use, the above described brooder is suspended with the supporting frame 1—1a at such elevation that the curtains 4 are clear of the ground and the curtain 6 in ground engagement, as previously explained. The electric heating units then warm the brooding areas 5, to which adequate but controlled air ventilation is assured from the openings 2. The poults press their way through the windbreak curtain 6 and enter the brooding areas 5 through the curtains 4; the arrangement of the feather curtains 4 and 6 being such that the brooder has substantial capacity without the necessity of crowding.

In the embodiment of Figs. 3-6 the general assembly of the brooder remains substantially the same as in the described embodiment of Figs. 1 and 2. Here, the supporting frame consists of the outer hexagonal shaped frame element 15 and the transverse frame elements 15a. However, the form and arrangement of the cover elements for the brooding areas is somewhat different. As shown in Figs. 3 and 5, the transverse frame elements 15a support in fixed relation a plurality of horizontal circular discs 16. As shown in Figs. 4 and 6, the elements 15a support a plurality of rectangular horizontal plates 17. The discs 16 or plates 17 define solid cover elements for the separate brooding areas, and beneath each disc or plate the same supports a heating unit (not shown). At the periphery of the discs 16 or plates 17 there is attached to each thereof a feather curtain, indicated at 18 and 19, respectively; these feather curtains corresponding to curtains 4 of the embodiment shown in Figs. 1 and 2, terminating short of the ground, and forming the sides of said separate brooding areas.

From all about the outer edge of the frame element 15 a windbreak feather curtain 21 depends into ground engagement, corresponding to the curtain 6 of Figs. 1 and 2.

From the foregoing description it will be readily seen that I have produced such a brooder as substantially fulfills the objects of the invention as set forth herein.

While this specification sets forth in detail the present and preferred construction of the brooder, still in practice such deviations from such detail may be resorted to as do not form a departure from the spirit of the invention, as defined by the appended claim.

Having thus described my invention, what I claim as new and useful, and desire to secure by Letters Patent is:

A brooder comprising a supporting frame, a depending curtain of feathers all about the outer edge of the frame and enclosing the entire area within the frame, a plurality of solid cover elements supported by the frame within its outer edges, such cover elements being substantially spaced apart to form ventilation openings from below said cover elements to the atmosphere above said cover elements, a depending curtain of feathers about each edge of each cover element to form a freely open brooding area beneath each cover element and between its corresponding curtain of feathers, the lower edges of the cover curtains being normally spaced from the ground whereby air from each brooding area may pass from such area through the space below the curtain edges and hence into the spaces between the several curtains and out said ventilation openings.

KENNETH RAPP.

REFERENCES CITED

The following references are of record in the file of this patent:

UNITED STATES PATENTS

| Number | Name | Date |
| --- | --- | --- |
| 331,096 | Strong | Nov. 24, 1885 |
| 773,660 | Malmgren | Nov. 1, 1904 |
| 918,174 | Lee | Apr. 13, 1909 |
| 1,120,738 | Norton | Dec. 15, 1914 |
| 1,179,553 | Norton | Apr. 18, 1916 |
| 1,209,444 | Jesse | Dec. 19, 1916 |
| 1,392,708 | Sheer | Oct. 4, 1921 |
| 1,440,756 | Winberg | Jan. 2, 1923 |
| 1,462,336 | Hale | July 17, 1923 |
| 1,533,834 | Cullinane | Apr. 14, 1925 |
| 1,581,857 | Morison | Apr. 20, 1926 |
| 1,842,672 | Hunter | Jan. 26, 1932 |
| 2,289,454 | Rapp | July 14, 1942 |